United States Patent [19]

Hetherington et al.

[11] Patent Number: 4,477,407

[45] Date of Patent: Oct. 16, 1984

[54] MACHINE DIRECTION ORIENTATION OF NYLON FILM

[75] Inventors: Brian L. Hetherington, Inverary; Peter H. Gray; Alistair N. Mollison, both of Kingston, all of Canada

[73] Assignee: E. I. Du Pont de Nemours and Company, Wilmington, Del.

[21] Appl. No.: 467,823

[22] Filed: Feb. 18, 1983

[30] Foreign Application Priority Data

Feb. 23, 1982 [CA] Canada .................................. 396859

[51] Int. Cl.³ .......................... B29D 7/24; B29G 7/00
[52] U.S. Cl. ................................ 264/288.4; 264/210.1
[58] Field of Search ........................... 264/288.4, 210.1

[56] References Cited

FOREIGN PATENT DOCUMENTS 1011520 7/1977 Canada .
53-128673 11/1978 Japan ................................. 264/288.4

Primary Examiner—Jay H. Woo
Assistant Examiner—Michael McGurk

[57] ABSTRACT

A process for machine direction orientation of nylon films in which nip rolls are applied to both the slow and fast orientation rolls with a substantially uniform force in the range of 15 to 45 N/cm width of nip roll. The temperature of the slow roll is held between 70° and 180° C. and the temperature of the fast roll is held between the temperature of the first roll and 20° C. below the melting temperature of the nylon film. The distance between the orientation rolls is in the range of 10 to 2050 μm.

5 Claims, 1 Drawing Figure

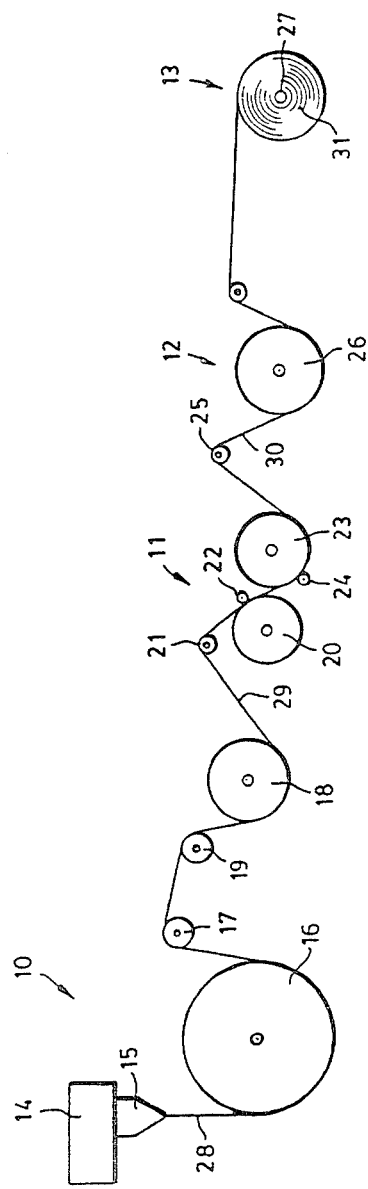
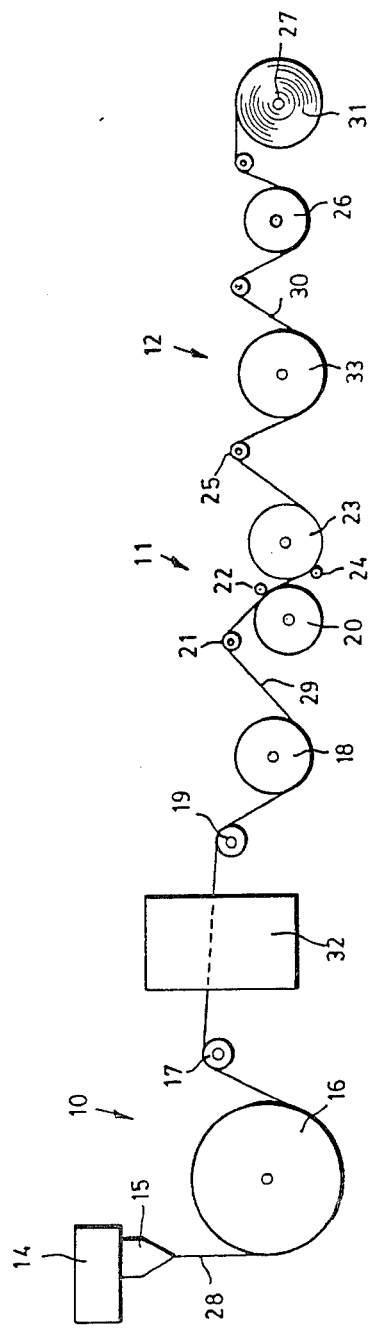
FIG. 1
FIG. 2

MACHINE DIRECTION ORIENTATION OF NYLON FILM

The present invention relates to machine direction (MD) orientation of nylon films, especially films of nylon 66 and copolymers of ε-caprolactam and hexamethylenediamine adipate.

It is known to orient nylon films in the machine direction. Canadian Patent No. 1 011 520 discloses machine direction orientation of nylon films, by a process in which the nylon films is stretched between two counter rotating rolls. The second roll rotates at a higher speed than the first roll. The film is not pressed to the second roll as, for example, by a nip roll. It is indicated in Canadian Patent No. 1 011 520 that it is essential that compressive forces on the second roll be absent in order to prevent wrinkling of the oriented film.

It has been found that by following the teachings of Canadian Patent No. 1 011 520 with respect to machine direction orientation of films made from homopolymers or certain copolymers of hexamethylenediamine adipate, oriented films resulting therefrom lack uniformity of film flatness. The term "film flatness" refers to a lack of bagginess or sag in a sample of taut unsupported film. Poor sheet flatness is usually characterized by centre bagginess or sagging edges in an otherwise taut film. It is essential that nylon film be substantially flat, when used for precision printing. Film flatness is especially important for oriented films of the homopolymers and copolymers of hexamethylenediamine adipate mentioned herein because of their relative lack of extensibility when compared with films of polyethylene or cast i.e. unoriented by nylon 6, for example.

Film flatness, referred to herein, may be measured by holding a length of film, between two rolls which are spaced apart by 305 cm. The film is held in tension in the longitudinal direction by holding the film stationary at one of the rolls and applying a tension, uniformly distributed across the web width, of 689 kPa at the other end of the film sample. The maximum extent of bagginess or sag of the film at midspan between the rolls is measured. This gives an indication of film flatness. For precision printing of oriented film of homopolymers and copolymers of hexamethylenediamine adipate, film flatness of about 5 cm or less is desired, and preferably less than 3 cm.

It has now been found that for films of homopolymers of hexamethylenediamine adipate, copolymers of hexamethylenediamine adipate and a comonomer selected from the group consisting of hexamethylenediamine sebacate, 11-aminoundecanoic acid, ε-caprolactam, 9-aminononanoic acid 12-aminoduodecanoic acid, hexamethylenediamine duodecanedioicate it is essential that compressive forces be applied at both orientation rolls and that the distance between the first and second orientation rolls be kept to a minimum.

Accordingly, the present invention provides a process wherein essentially unoriented nylon film is oriented between first and second counter-rotating orientation rolls, the ratio of the peripheral speed of the second of such rolls to that of the first of such rolls being between about 1.1 and about 5.5, each orientation roll having a nip roll associated therewith, said nip rolls applying substantially uniform force across the width of such nip rolls onto the associated orientation roll, the force applied by each of the nip rolls being in the range of 15 to 45 newtons per centimeter width of nip roll, the distance between the orientation rolls being in the range of 100 to 2050 μm, the temperature of the first orientation roll being held at between 70° and 180° C. and the temperature of the second orientation roll being held at between the temperature of the first orientation roll and 20° C. below the melting temperature of the nylon film, said nylon film being made from the group consisting of (a) a homopolymer of hexamethylenediamine adipate, and (b) a copolymer of hexamethylene diamine adipate and a comonomer selected from the group consisting of ε-caprolactam, 11-aminoundecanoic acid, 12-aminoduodecanoic acid, and hexamethylene diamine duodecanate, the content of said hexamethylenediamine adipate in said copolymer being at least 10% by weight of the comonomer and hexamethylene diamine adipate prior to polymerization, said homopolymer or copolymer having a relative viscosity between about 40 and 100.

Relative viscosity (RV) of the polymer is measured by comparing the viscosity, at 25° C., of a solution of 8.4% by weight of the polymer in a solvent consisting of 90% by weight formic acid and 10% by weight of water to the viscosity, at 25° C., of the formic acid—water solvent.

In a preferred embodiment the ratio of the peripheral speed of the second orientation roll to that of the first orientation roll is between about 2.6 and 4.8, especially between 3.0 and 4.2.

In another embodiment the temperature of the first orientation roll is between about 140° C. and 180° C.

In a further embodiment the temperature of the second orientation roll is between 190° C. and 30° C. below the melting temperature of the nylon film.

In another embodiment the angle between the radii of an orientation roll at the position of minimum gap between the first and second orientation rolls and at the line of contact of the orientation roll and its associated nip roll is less than 45°.

In a preferred embodiment the nip rolls are placed as close to the minimum gap between the first and second orientation rolls as the diameters of the orientation and nip rolls will allow.

In a further embodiment, the nylon film is preheated prior to passing over the first orientation roll. Preferably preheating is accomplished by passing the film over a pre-heat roll.

In another embodiment the oriented film is passed over an annealing roll situated between the second orientation roll and the quench roll, the temperature of the annealing roll being set at about the temperature of the second orientation roll.

In a further embodiment, the film is allowed to shrink from 1 to 8% in the machine direction subsequent to being oriented. Preferably the amount of shrinkage is from 1 to 4%.

In another embodiment the unoriented film may be treated with steam to an extent sufficient to provide the film with a moisture content of from 0.5 to 2.0% by weight.

The temperature of the first orientation roll may be referred to herein as the orienting temperature and the temperature of the second orienting and the annealing roll, if present, may be referred to herein as the annealing temperature.

The ratio of the peripheral speeds of the second and first orientation rolls is sometimes referred to herein as the draw ratio.

The present invention may be illustrated by reference to the drawings in which:

FIG. 1 shows, in diagrammatic form, apparatus for carrying out an embodiment of the present invention;

FIG. 2 shows, in diagrammatic form, apparatus for carrying out a preferred embodiment of the present invention.

Referring to the drawings, apparatus which may be used in the present invention includes a flat film casting apparatus 10, orientation means 11, quenching means 12 and wind up apparatus 13.

The film casting apparatus comprises and extruder 14 with flat film die 15, a chill roll 16 and associated stripper roll 17. The orientation means 11 comprises a preheat roll 18 with associated lay-on roll 19, a first orientation roll 20 with associated lay-on roll 21 nip roll 22, a second orientation roll 23 with associated nip roll 24, a stripper roll 25 and a quench roll 26. The wind-up apparatus 13 comprises a wind-up mandrel 27 with associated drive and tensioning means (not shown). Chill roll 16, preheat roll 18, orientation rolls 20 and 23 and quench roll 26 each have means (not shown) for maintaining the temperature of surface of each roll at a preset temperature.

In the process of the present invention cast i.e. substantially unoriented film 28 is extruded from extrusion die 15 and solidified and quenched by chill roll 16. Chill roll 16 may be kept at a temperature in the range of 60° to 110° C. depending on the crystallinity level desired for the cast film. As will be apparent to those skilled in the art, quick quenching through use of a low temperature at the chill roll leads to production of a more amorphous cast film than slow quenching through use of a higher temperature at the chill roll.

Cast film 28 is then pre-heated to about the temperature of the first orientation roll 20 by passing the film over pre-heat roll 18. The preheated film 29 then passes to the first orientation roll 20 and through a narrow e.g. 250 μm orientation gap between the first and second orientation rolls 20 and 23. During passage of the film over the first and second orientation rolls the film is firmly and uniformly nipped between the first orientation roll 20 and its associated nip roll 22 and the second orientation roll 23 and its associated nip roll 24. The force on each of nip rolls 22 and 24 must be substantially uniform across the width of the nip roll and be from about 15 to 45N/cm of nip roll length.

Uniform force across the nip rolls may be achieved through crowning of the nip roll, as is known in the art and applying the requisite level of force to the nip roll. The level of force on the nip roll depends on the extent of crowning and the compressibility of the material of construction of the nip roll. Nip roll 22 is best located as near to the orienting gap as possible in order to minimize the extent of transverse necking-in at the edges of the film during machine direction orientation.

Preferably the unoriented film 29 is guided onto the first orientation roll 20 in such a manner to minimize the distance the film has to travel between its first point of contact with the first orientation roll and the point of nip between first orientation roll 20 and its associated nip roll 22. This is accomplished through correct positioning of lay-on roll 21. Positioning lay-on roll 21 in this manner minimizes entrapment of air between the film and first orientation roll 20.

The oriented film is passed over the second orientation roll 23 which is held at a temperature between that of the first orientation roll 20 and 20° C. below the melting temperature of the nylon polymer.

Preferably the oriented film is relaxed during the annealing step by driving quench roll 26 at a peripheral speed 1–8% less than the peripheral speed of second orientation roll 23. Preferably the difference in peripheral speeds is between 1 and 4%. The film is then quenched by passing the relaxed film 30 over quench roll 26 prior to being wound up into a film roll 31 on mandrel 27.

Referring now to FIG. 2, the apparatus shown in FIG. 1 may also include a steam chest 32 situated between chill roll 16 and preheat roll 18, and annealing roll 33 situated between second orientation roll 23 and quench roll 26.

Using the apparatus of FIG. 2, the unoriented film 28, after passage around chill roll 16, is subjected to a steam treatment in steam chest 32. The moisture content of the film leaving the steam chest may be controlled between 0.5 to 2.0% by weight of the film by controlling the steam temperature and film residence time in steam chest 32.

Annealing roll 33 is typically maintained at the same temperature as that of the second orientation roll 23.

In order to attain the best dimensional stability of the oriented film of the present invention, the temperatures of the first and second orientation rolls 20 and 22, and optional annealing roll 33 should be kept at the upper end of the temperature ranges specified hereinbefore. It is preferred that the temperature of the first orientation roll 20 be kept between about 160° and 170° C. and that of the second orientation roll 23 and optional annealing roll 33 be kept between about 170° C. and 20° C. below the melting temperature of the film. Dimensional stability is expressed in terms of percent shrinkage of a 25.4 cm by 25.4 cm sample of film, measured after maintaining the sample of 160° C. for 3 minutes. The effect of the temperatures of the first and second orientation rolls may be illustrated by reference to Table I below.

TABLE I

| Film | Draw Ratio | Temperature °C. First Roll | Temperature °C. Second Roll | Dimensional Stability* MD | Stability* TD |
|---|---|---|---|---|---|
| Nylon 66 | 4.1 | 94 | 200 | 5.3 | 0.4 |
| Nylon 66 | 4.1 | 169 | 200 | 1.6 | 0 |
| Nylon 66 | 3.6 | 90 | 160 | 5.7 | 1.2 |

*MD = Machine Direction; TD = Transverse Direction

As indicated herein, the forces exerted by the nip rolls on the first and second orientation rolls is critical. Table II shows the effect of nip roll force on film flatness for a nip roll having a surface of Hypalon<sup>a</sup> rubber and having a crowning of 2% of the nominal roll diameter.

<sup>a</sup>denotes trade mark.

TABLE II

| Film | Draw Ratio | Temperature °C. First Roll | Temperature °C. Second Roll | Nip Force N/cm (both rolls) | Film Flatness cm |
|---|---|---|---|---|---|
| Nylon 66 | 3.7 | 169 | 200 | 0** | 8.2 |
| Nylon 66 | 3.7 | 169 | 200 | 33 | 3.2 |
| Nylon A+ | 3.7 | 164 | 177 | 0** | 10.8 |
| Nylon A+ | 3.7 | 164 | 177 | 24.8 | 6.3 |
| Nylon A+ | 3.7 | 164 | 177 | 33 | 2.5 |
| Nylon A+ | 3.7 | 164 | 177 | 41.1 | 4.4 |

**Nip roll not engaged

+Nylon A is a copolymer of hexamethylenediamine adipate and ε-caprolactam in which the ratio of hexamethylenediamine adipate to ε-caprolactam is 90:10% by weight prior to polymerization, and having a relative viscosity of 52.

The homopolymer or copolymers of hexamethylenediamine adipate used in the present invention may be made by techniques known in the art. For example the homopolymer may be made by heating an aqueous solution of hexamethylenediamine adipate, otherwise known as nylon 66 salt, until the water of solution is driven off and sufficient water of reaction driven off for the nylon 66 so formed to reach the required extent of polymerization. The extent of polymerization is indicated by relative viscosity measurements (RV). The copolymers may be made by similar processes in which nylon 66 salt is admixed with an aqueous solution of the appropriate quantity of the comonomer e.g. ε-caprolactam and similarly heated until the required extent of copolymerization is attained.

The homopolymers or copolymers may be made by a batch process or by a continuous process, both types of process being known in the art. Usually such processes result in the homopolymer or copolymer being extruded in flake or pellet form. The flake or pellets may then be re-melted in an extruder prior to extruding through an elongated die to form a sheet of film. The nylon so extruded may be "vacuum finished" in the extruder i.e. allowed to polymerize even further through vacuum venting of further water of reaction, as disclosed for example in Canadian patent No. 730 058 issued Mar. 15, 1966 to Bentley, Priebe and Wood. The relative viscosity of the homopolymer, copolymer upon extrusion into flat film may be in the range of 40 to 100. The film so extruded is then quenched, moisturized if required, and oriented as described hereinbefore.

The oriented film of the present invention may then be laminated to a sealant web e.g. polyethylene, ethylene vinyl acetate copolymer, ionomer, printed and then used for packaging food products e.g. bacon, weiners. The films of the present invention are particularly suitable for packaging food products because of their relatively balanced tear properties in the machine and transverse directions. It will be understood that the casting i.e. extrusion and orientation steps need not be done concurrently. If more convenient, cast film may be stored on a roll prior to subjecting it to the orientation process of the present invention.

The examples following serve to illustrate the invention further. ASTM Procedure D-638-77A, sample Type IV was used to determine ultimate tensile strength (UTS); ASTM Procedure D-1004 for Graves tear strength; and ASTM Procedure D-1922-67 for Elmendorf tear strength.

EXAMPLE 1

A 60 RV nylon 66 polymer was extruded at a rate of 27.3 kg/hr at 288° C. using a single screw extruder through a 711 mm wide flat film die. The molten web contacted two quench rolls in series set at 125° C. and 75° C. respectively to produce 128 μm film at a line speed of 0.127 meters/sec. This film proceeded to preheat and first orientation rolls at 167° C., and oriented at a draw ratio of 3.6 with an orienting gap of 300 μm, a second orientation roll temperature of 200° C., and a quench roll temperature of 40° C. 4″ diameter nip rolls covered with Hypalon synthetic rubber, having a crowning of 2% of the nominal roll diameter nipped the film to the first and second orientation rolls with force of 33N/cm length of nip roll. The film was allowed to shrink 1.5% in the annealing zone between the second orientation roll and quench roll. The film was subsequently wound up at a line speed of 0.450 meters/sec. This experiment is referred to hereinbelow as the in-line process.

The above experiment was repeated with the exception that the cast film was wound up, and subsequently fed to the orientation rolls in separate step. This experiment is referred hereinbelow as the out-of-line process.

The physical properties of both films so produced are shown in the following table. Neither of the films were wrinkled.

|  | UTS (psi) | | Modulus (psi) | |
| --- | --- | --- | --- | --- |
|  | MD | TD | MD | TD |
| in-line process | 39 000 | 7990 | 386 000 | 340 000 |
| out-of-line process | 40 000 | 8000 | 357 000 | 247 000 |

|  | Graves Tear (gm/mil) | | Dimensional Stability | |
| --- | --- | --- | --- | --- |
|  | MD | TD | MD | TD |
| in-line process | 1480 | 953 | 2.7 | 0.15 |
| out-of-line process | 1094 | 586 | 4.3 | 0 |

EXAMPLE 2

A 41 RV 90% hexamethylene diamine adipate/10% ε-caprolactam copolymer (copolymer B) was extruded at a rate of 550 kg/hr at 283° C. using a twin-screw extruder through a flat film die. The final film RV was 53. The molten web contacted a chill roll at 75° C. and subsequent annealing roll set at 105° C. and drawn down to produce a 51 μm unoriented film at a line speed of 1.03 meters/sec. The film was steam treated to produce a moisture level of 1.0%. This film was subsequently oriented in a separate step using an embodiment of the present invention with preheat and first orientation roll temperature of 163° C., a second orientation roll temperature of 183° C. a quench roll temp. of 40° C., a draw ratio of 3.7, an orienting gap of 250 μm and nip rolls contacting the film to the first and second orientation rolls with a force of 33N/cm length of nip roll. The film was allowed to shrink 1.5% in the annealing zone between the second orientation and quench rolls and subsequently wound up at a line speed of 1.20 meters/sec. The physical properties compared to nylon 66 film processed at essentially equivalent conditions and nylon 6 film run at 154° C. first orientation roll temperature, 197° C. second orientation roll temperature, a draw ratio of 4.1 and orienting gap of 250 m were as follows:

|  | UTS (psi) | | Modulus (psi) | | Graves Tear (gm/mil) | |
| --- | --- | --- | --- | --- | --- | --- |
|  | MD | TD | MD | TD | MD | TD |
| Copolymer B | 44 527 | 9105 | 259 000 | 284 000 | 1000 | 600 |
| nylon 66 | 49 164 | 6967 | 502 000 | 405 000 | 1348 | 1044 |
| nylon 6 | 50 842 | 9532 | 278 000 | 338 000 | 1462 | 1071 |

|  | Elmendorf Tear (gm/mil) | | Gelbo Flex (pinholes/3000 cycles) |
| --- | --- | --- | --- |
|  | MD | TD |  |
| Copolymer B | 138 | 94 | 9 |
| nylon 66 | 175 | 132 | 77 |
| nylon 6 | 116 | 82 | 23 |

None of the films were wrinkled.

EXAMPLE 3

The copolymer nylon of example 2 was extruded under similar conditions to example 2 except that the chill roll and annealing roll were held at 60° C. and 80° C. respectively, and a 76 μm unoriented film was produced at a line speed of 0.686 meters/sec. This unoriented film was subsequently oriented using the orientation annealing and quenching steps described in Example 1 with preheat and first orientation roll temperatures of 156° C., second orientation roll temperature of 176° C., a quench roll temperature of 40° C., a draw ratios of 3.8, an orienting gap of 250 μm, and nip rolls contacting the film to the first and second orientation rolls with a force of 33N/cm length of nip roll. The film was allowed to shrink 1.5% in the annealing zone and subsequently wound up at a line speed of 1.07 meters/sec.

The experiment was repeated, but with a draw ratio of 4.85.

The physical properties of the films so produced were as follows:

| Draw Ratio | UTS (psi) MD | UTS (psi) TD | Modulus (psi) MD | Modulus (psi) TD | Graves Tear (gm/mil) MD | Graves Tear (gm/mil) TD |
| --- | --- | --- | --- | --- | --- | --- |
| 3.8 | 42 000 | 7850 | 215 000 | 225 000 | 765 | 910 |
| 4.85 | 45 000 | 7850 | 255 000 | 285 000 | 890 | 645 |

| Draw Ratio | Elmendorf Tear (gm/mil) MD | Elmendorf Tear (gm/mil) TD | Gelbo Flex (pinholes/ 3000 cycles) |
| --- | --- | --- | --- |
| 3.8 | 320 | 18 | 23 |
| 4.85 | 360 | 60 | 62 |

Neither of the films were wrinkled.

EXAMPLE 4

42 RV nylon 66 polymer was extruded at a rate of 600 kg/hr. at 283° C. using a twin screw extruder through a flat film die. The final film RV was 53. The molten web contacted a chill roll at 75° C. and subsequent annealing roll set at 105° C. and drawn down to produce 51 μm cast film at a line speed of 1.12 meters/sec. The film was steam treated to produce a moisture level of 0.9%. The film was subsequently oriented using the orienting, annealing and quenching steps described in Example 1. The process conditions were as shown below; otherwise the nip roll force was 33N/cm, the quench roll temperature was 40° C. and the film was allowed to shrink 1.5% in the annealing zone.

| Run No. | Orienting Gap m | Draw Ratio | Line Speed meters/sec | Orienting Temp. °C. | Annealing Temp. °C. |
| --- | --- | --- | --- | --- | --- |
| 1 | 127 | 3.7 | 0.752 | 150 | 200 |
| 2 | 127 | 4.3 | 0.752 | 151 | 200 |
| 3 | 280 | 4.1 | 1.27 | 168 | 200 |
| 4 | 127 | 4.1 | 1.27 | 168 | 200 |

| Run No. | UTS (psi) MD | UTS (psi) TD | Modulus (psi) MD | Modulus (psi) TD | Elmendorf Tear (gm/mil) MD | Elmendorf Tear (gm/mil) TD |
| --- | --- | --- | --- | --- | --- | --- |
| 1 | 51 259 | 8448 | 397 000 | 424 000 | 141 | 134 |
| 2 | 52 640 | 7184 | 482 000 | 451 000 | 121 | 89 |
| 3 | 50 080 | 7728 | 464 000 | 436 000 | 139 | 99 |
| 4 | 58 462 | 8144 | 484 000 | 428 000 | 176 | 103 |

| Run No. | Graves Tear (gm/mil) MD | Graves Tear (gm/mil) TD | Dimensional Stability MD | Dimensional Stability TD |
| --- | --- | --- | --- | --- |
| 1 | 1294 | 1185 | 2.98 | 1.18 |
| 2 | 1330 | 1235 | 1.84 | 0.13 |
| 3 | 1362 | 1012 | 2.6 | 0 |
| 4 | 1339 | 1135 | 1.59 | 0 |

None of the films were wrinkled.

EXAMPLE 5

51 μm films were produced as in examples 2 and 4 except that an annealing roll was incorporated between the second orientation roll and the quench roll. The orienting gap was 381 μm, the nip roll force was 26.3N/cm, and the quench roll was set at 44° C. The film was allowed to shrink 3% between the annealing roll and the final quench roll.

| | Draw Ratio | Line Speed meters/sec | Orienting Temp. °C. | Annealing Temp (2 rolls) °C. |
| --- | --- | --- | --- | --- |
| nylon 66 | 3.4 | 2.29 | 173 | 235 |
| nylon 66/6 | 3.2 | 6.06 | 173 | 210 |

| | UTS (psi) MD | UTS (psi) TD | Modulus (kpsi) MD | Modulus (kpsi) TD | Graves Tear (gm/mil) MD | Graves Tear (gm/mil) TD | Elmendorf Tear (gm/mil) MD | Elmendorf Tear (gm/mil) TD |
| --- | --- | --- | --- | --- | --- | --- | --- | --- |
| nylon 66 | 37429 | 10460 | 344 | 327 | 1213 | 724 | 74 | 92 |
| nylon 66/6 | 38414 | 9305 | 282 | 262 | 1258 | 727 | 101 | 155 |

None of the films were wrinkled.

We claim:

1. A process wherein essentially unoriented nylon film is oriented between first and second counter-rotating orientation rolls, the ratio of the peripheral speed of the second of such rolls to that of the first of such rolls being between about 1.1 and about 5.5, each orientation roll having a nip roll associated therewith, said nip rolls applying substantially uniform force across the width of such nip rolls onto the associated orientation roll, the force applied by each of the nip rolls being in the range of 15 to 45 newtons per centimeter width of nip roll, the distance between the orientation rolls being in the range of 100 to 2050 μm, the temperature of the first orientation roll being held at between 70° and 180° C. and the temperature of the second orientation roll being held at between the temperature of the first orientation roll and 20° C. below the melting temperature of the nylon film, said nylon film being made from the group consisting of (a) a homopolymer of hexamethylenediamine adipate, and (b) a copolymer of hexamethylene diamine adipate and a comonomer selected from the group consisting of ε-caprolactam, 9-aminononanoic acid, 11-aminoundecanoic acid, 12-aminoduodecanoic acid, and hexamethylene diamine duodecanedioicate, the content of said hexamethylenediamine adipate in the copolymer being at least 10% by weight of the comonomer and hexamethylene diamine adipate prior to polymerization, said homopolymer or copolymer having a relative viscosity between about 40 and 100.

2. A process according to claim 1 wherein the ratio of the peripheral speeds of the second orientation roll to that of the first orientation roll is between about 2.6 and about 4.8.

3. A process according to claim 2 wherein the temperature of the first orientation roll is between about 140° C. and 180° C.

4. A process according to claim 2 wherein the temperature of the second orientation roll is between 190° C. and 30° C. below the melting temperature of the nylon film.

5. A process according to claim 2, claim 3 or claim 4 wherein the film is allowed to shrink from 1 to 8% the machine direction subsequent to being oriented.

* * * * *